United States Patent
Strong et al.

(10) Patent No.: US 8,947,232 B2
(45) Date of Patent: Feb. 3, 2015

(54) FAULT-TOLERANT DISTRIBUTED FIBER OPTIC INTRUSION DETECTION

(75) Inventors: Andrew Strong, Romsey (GB); Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 721 days.

(21) Appl. No.: 12/518,971

(22) PCT Filed: Dec. 6, 2007

(86) PCT No.: PCT/GB2007/004673
§ 371 (c)(1),
(2), (4) Date: Nov. 18, 2009

(87) PCT Pub. No.: WO2008/081157
PCT Pub. Date: Jul. 10, 2008

(65) Prior Publication Data
US 2010/0117830 A1     May 13, 2010

(30) Foreign Application Priority Data
Dec. 29, 2006 (GB) .................................. 0625850.3

(51) Int. Cl.
*G08B 13/18* (2006.01)
*G08B 13/00* (2006.01)
(Continued)

(52) U.S. Cl.
CPC .............. *G08B 13/186* (2013.01); *G01H 9/004* (2013.01)
USPC ........... 340/555; 340/541; 340/524; 340/525; 385/12; 385/100; 250/216; 250/227.23

(58) Field of Classification Search
CPC ............ G08B 13/122; G08B 13/1895; G01M 11/3145; G01D 5/268
USPC ........................................... 340/541, 524, 525
See application file for complete search history.

(56) References Cited

U.S. PATENT DOCUMENTS 5,194,847 A * 3/1993 Taylor et al. .................. 340/557
6,002,820 A * 12/1999 Nitta .............................. 385/24
(Continued)

FOREIGN PATENT DOCUMENTS

| FR | 2870984 A1 | 12/2005 |
| JP | 58184228 A | 10/1983 |

(Continued)

OTHER PUBLICATIONS

International Search Report issued in PCT/GB2007/004673 on Oct. 7, 2008, 3 pages.
(Continued)

*Primary Examiner* — Daniel Wu
*Assistant Examiner* — Mohamed Barakat (57) ABSTRACT

An intrusion detection system for monitoring a premises includes at least one optical cable that houses at least one optical fiber and extends about the premises. Optical time domain reflectometry (OTDR) means is operably coupled to opposite first and second ends of the at least one optical fiber. The OTDR means includes first signal processing circuitry that analyzes the backscatter signal received via the first end of the at least one optical fiber in order to detect an intrusion of the premises, and second signal processing circuitry that analyzes the backscatter signal received via the second end of the at least one optical fiber in order to detect an intrusion of the premises. The redundancy of intrusions decisions made by the first and second signal processing circuitry can be verified. The system preferably further includes means for detecting a break in the at least one fiber, for identifying location of the break, for outputting to a user the location of the break, and for raising an alarm indicating the break.

23 Claims, 6 Drawing Sheets

(51) Int. Cl.
*G08B 25/00* (2006.01)
*G02B 6/00* (2006.01)
*G02B 6/44* (2006.01)
*H01J 3/14* (2006.01)
*G01N 21/25* (2006.01)
*G08B 13/186* (2006.01)
*G01H 9/00* (2006.01)

(56) References Cited

U.S. PATENT DOCUMENTS

| | | | |
|---|---|---|---|
| 6,980,108 B1 * | 12/2005 | Gebbia et al. | 340/555 |
| 7,092,586 B2 * | 8/2006 | Vokey et al. | 385/12 |
| 7,110,625 B2 * | 9/2006 | Chun | 385/12 |
| 7,120,324 B2 * | 10/2006 | Murphy et al. | 385/12 |
| 7,221,439 B2 * | 5/2007 | Chen et al. | 356/73.1 |
| 7,228,024 B2 * | 6/2007 | Wang | 385/15 |
| 7,336,898 B2 * | 2/2008 | Fling et al. | 398/21 |
| 7,543,982 B2 * | 6/2009 | Yamamoto et al. | 374/131 |
| 7,668,411 B2 * | 2/2010 | Davies et al. | 385/12 |
| 7,872,736 B2 * | 1/2011 | Rogers et al. | 356/73.1 |
| 2001/0026660 A1 * | 10/2001 | Asakura et al. | 385/47 |
| 2005/0002017 A1 * | 1/2005 | Haran | 356/73.1 |
| 2005/0024210 A1 | 2/2005 | Maki | |
| 2005/0152700 A1 * | 7/2005 | Fling et al. | 398/135 |

FOREIGN PATENT DOCUMENTS

| | | |
|---|---|---|
| JP | 60112198 A | 6/1985 |
| JP | 06186091 A | 7/1994 |
| JP | 2000082187 A * | 3/2000 |
| JP | 2001006055 A | 1/2001 |
| RU | 2214583 C1 | 10/2003 |
| RU | 2226270 C2 | 3/2004 |
| SU | 1427245 A1 | 9/1988 |
| WO | 2006052776 A2 | 5/2006 |

OTHER PUBLICATIONS

Written Opinion of the International Searching Authority issued in PCT/GB2007/004673 on Jun. 29, 2009, 5 pages.
Decision on Grant issued in RU2009129150 on Sep. 29, 2011, 19 pages.
Office Action issued in JP2009543513 on Jul. 23, 2012, 4 pages.

* cited by examiner

FAULT-TOLERANT DISTRIBUTED FIBER OPTIC INTRUSION DETECTION

BACKGROUND OF THE INVENTION

1. Field of the Invention

This invention relates broadly to security systems and intrusion detector used therein. More particularly, this invention relates to fiber optic intrusion detectors.

2. State of the Art

Intrusion detectors are widely used in security systems to monitor the boundaries of a well-defined area in order to detect the presence, location and motion of people and vehicles. Exemplary applications for such intrusion detectors include the monitoring of the perimeters of national boundaries, military facilities, chemical plants, airports, rail stations and correctional facilities. One of the challenges for these detectors is the need to operate remotely in harsh environments with exposure to wide temperature ranges as well as rain, snow, and dirt.

Fiber optic sensors have been developed for intrusion detection. The fiber optic sensor has inherent advantages in that the fiber optic sensing element is passive (it does not carry electricity), which is particularly important for facilities with highly combustible materials. The fiber optic sensing element can also span over extended lengths (e.g., tens of kilometers). The fiber optic sensing element is immune to electromagnetic effects that might otherwise damage or interfere with its operation. And the fiber optic sensing element is readily available at competitive prices and in ruggedized cables capable of withstanding harsh environments.

Fiber optic intrusion detection systems are commercially-available from Future Fibre Technologies Pty Ltd of Mulgrave, Victoria, Australia and Fiber Sensys of Hillsboro, Oreg., USA. The Future Fibre Technologies system operates using a fiber optic loop including a forward path and a return path. The forward path includes two separate optical fibers. The return path includes a single optical fiber. The two optical fibers of the forward path form the arms of an interferometer. Continuous laser light is sent down the two arms of the interferometer. The light returned by the return path is analyzed. If there has been no external interference (motion, sound or vibrations) acting on the two arms of the interferometer, the return light will not change. If there is an external interference acting on the two arms of interferometer, the return light will change and an interference pattern generated. A controller detects this change and will interpret the effect as either an intrusion event or an ambient condition. The Fiber Sensys system injects coherent light into a multimode fiber. The mode of the light disperses along its length and mixes at the fiber's terminus, resulting in characteristic pattern of light and dark splotches called speckle. The laser speckle is stable as long as the fiber remains immobile, but flickers when the fiber is vibrated due to environmental effects (such as a person or vehicle passing nearby). Intrusion detection is accomplished by analyzing the speckle pattern over time. In either system, a break in the fiber optic sensor completely disables the intrusion detection system. Moreover, either system cannot detect and report the position of the fiber break.

An alternative approach is proposed in U.S. Pat. No. 5,194,847 to Taylor et al. In the Taylor system, light from a highly-coherent pulsed laser is launched into a sensing optical fiber. As the individual pulses propagate within the fiber in the forward direction, normal Rayleigh scattering causes a proportion of the light to be scattered uniformly, with a small fraction being recaptured by the fiber before it propagates in the reverse direction to the receiver. The coherent (narrow linewidth) nature of the launched pulses ensures that detectable optical interference can take place between the components of the scattered light. The system analyzes the phase changes and corresponding time delays of the backscatter signal in order to collect a spatial distribution of localized disturbances along the sensing fiber. In the static case, the spatial distribution is random but stable. In the dynamic case (which can be caused, for example, by a disturbance by an unauthorized intruder or vehicle), the localized pattern changes. Such changes can be used to indicate the occurrence of an intrusion and the approximate location of the intrusion along the sensing fiber. In this system, a break in the fiber would disable the capability for intrusion detection at points beyond the break. Such limitations hinder the deployment of such systems in critical security applications and provide opportunities for organized groups (terrorists, thieves and other undesirable third parties) to quickly disable these systems.

Thus, there remains a need in the art for fiber-optic based intrusion detection systems that can operate without interruption in the event that a break occurs in the sensing optical fiber of the system.

SUMMARY OF THE INVENTION

It is therefore an object of the invention to provide a fiber-optic based intrusion detection system that can operate without interruption in the event that a break occurs in the sensing optical fiber of the system.

It is another object of the invention to provide such a fiber-optic based intrusion detection system that identifies and reports the position of such a break.

In accord with these objects, which will be discussed in detail below, an intrusion detection system for monitoring a premises includes at least one optical cable that houses at least one optical fiber and extends about the premises. Optical time domain reflectometry (OTDR) means is operably coupled to opposite first and second ends of the at least one optical fiber. The OTDR means includes first signal processing circuitry that analyzes the backscatter signal received via the first end of the at least one optical fiber in order to detect an intrusion of the premises, and second signal processing circuitry that analyzes the backscatter signal received via the second end of the at least one optical fiber in order to detect an intrusion of the premises. The redundancy of intrusions decisions made by the first and second signal processing circuitry can be verified. The system preferably further includes means for detecting a break in the at least one fiber, for identifying location of the break, for outputting to a user the location of the break, and for raising an alarm indicating the break.

It will be appreciated that the fiber-optic based intrusion detection systems described herein provide continued operation in the event that a break occurs in the sensing optical fiber of the system. Such systems also report the position of such a break. Moreover, the fiber-optic based intrusion detection systems described herein can be used for a wide variety of applications, such as monitoring national boundaries, military facilities, chemical plants, airports, rail stations, correctional facilities, a power cable, a tunnel, a pipeline, a building, or other smart structures.

According to one embodiment of the invention, the OTDR means includes a laser source for generating optical pulses, an optical detector, and a directional coupler and an optical switch operably coupled between the laser source and an optical fiber pair. The directional coupler and the optical switch cooperate to direct the optical pulses generated by the laser source over the optical fibers of the pair in a timedivision-multiplexed manner and to direct scatter that propagates back along the optical fiber pair to the optical detector in a time-division-multiplexed manner. The first signal processing circuitry analyzes the backscatter signal received via the first end of one optical fiber of the pair in order to detect an intrusion of the premises. The second signal processing circuitry analyzes the backscatter signal received via the second end of the other optical fiber of the pair in order to detect an intrusion of the premises.

According to another embodiment of the invention, the OTDR means includes a first laser source for generating optical pulses, a first optical detector, and a first directional coupler operably coupled between the first laser source and the first end of one optical fiber of an optical fiber pair. The first directional coupler directs optical pulses generated by the first laser source over the one optical fiber and directs scatter that propagates back along the one optical fiber to the first optical detector. The first signal processing circuitry analyzes the backscatter signal received via the one optical fiber in order to detect an intrusion of the premises. The OTDR means also includes a second laser source for generating optical pulses, a second optical detector, and a second directional coupler operably coupled between the second laser source and the second end of the other optical fiber of the optical fiber pair. The second directional coupler directs the optical pulses generated by the second laser source over the other optical fiber and directs scatter that propagates back along the other optical fiber to the second optical detector. The second signal processing circuitry analyzes the backscatter signal received via the other optical fiber in order to detect an intrusion of the premises.

According to yet another embodiment of the invention, the OTDR means includes a first laser source for generating optical pulses at a first wavelength, a first optical detector, and a first directional coupler operably coupled between the first laser source and the first end of an optical fiber. The first directional coupler directs the optical pulses generated by the first laser source over the optical fiber and directs scatter that propagates back along the optical fiber to the first optical detector. The first signal processing circuitry analyzes the backscatter signal at the first wavelength received via the first end of the optical fiber in order to detect an intrusion of the premises. The OTDR means also includes a second laser source for generating optical pulses at a second wavelength different than the first wavelength, a second optical detector, and a second directional coupler operably coupled between the second laser source and the second end of the optical fiber. The second directional coupler directs the optical pulses generated by the second laser source over the optical fiber and directs scatter that propagates back along the optical fiber to the second optical detector. The second signal processing circuitry analyzes the backscatter signal at the second wavelength received via the second end of the optical fiber in order to detect an intrusion of the premises.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
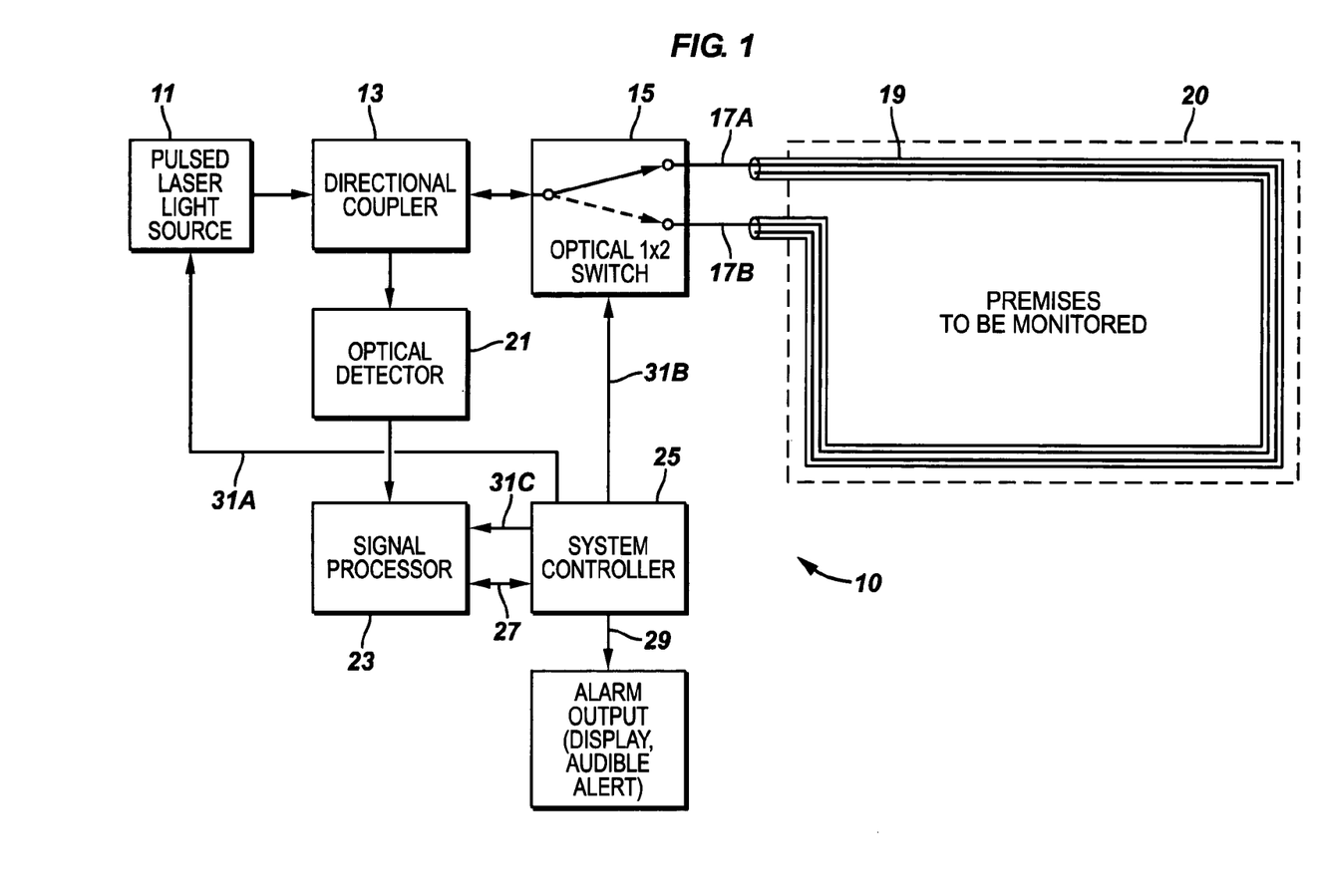
FIG. 1 is a schematic illustration of a fiber optic intrusion detection system in accordance with a first embodiment of the present invention.

Turning now to FIG. 1, an intrusion detection system 10 in accordance with a first embodiment of the present invention includes an optical time domain reflectometer (OTDR) (elements 11, 13, 15, 21, 23) that injects a series of optical pulses into opposite ends of two optical fibers 17A, 17B, and extracts from these same opposite ends light that is scattered back and reflected back from points in the fibers where the index of refraction changes. The backscatter light is measured and stored as a function of time, and analyzed to make an intrusion decision in a fault tolerant manner.

More particularly, the optical time reflectometer is realized by a pulsed-mode laser source 11 that launches a sequence of highly-coherent light pulses through a directional coupler 13 to an optical switch 15. The optical switch 15 alternately directs the light pulses generated by the laser source 11 to two optical fibers 17A, 17B in a time-division-multiplexed manner. The optical fibers 17A, 1B form the sensing element of the system, and are housed in a fiber optic cable 19, which is deployed about the periphery of the premises 20 that is to be monitored for intrusion detection. This may be along national boundaries, military facilities, chemical plants, airports, rail stations, correctional facilities, a power cable, a tunnel, a pipeline, a building, or other smart structures. For pipelines, the fiber optic cable 19 can be deployed to monitor the pipeline right of way in order to detect construction equipment entering the pipeline right-of-way before it can damage the pipeline. At one end of the fiber optic cable 19, the fiber optic 17A is coupled to the optical switch 15 as shown. At the other end of the fiber optic cable 19, the fiber optic 17B is coupled to the optical switch 15 as shown. In this configuration, the fiber optic 17A extends along the periphery of the premises 20 to be monitored in a clockwise direction, and the fiber optic 17B extends along the periphery of the premises 20 to be monitored in an opposite counter-clockwise direction. As a pulse propagates along either one of the optical fiber 17A or the optical fiber 17B, its light is scattered through several mechanisms, including density and composition fluctuations (Rayleigh scattering) as well as molecular and bulk vibrations (Raman and Brillouin scattering, respectively). Some of this scattered light is retained within the respective fiber core and is guided back towards the laser source 11. This returning light passes through the optical switch 15 to the directional coupler 13, where it is directed to an optical detector 21.

The optical detector 21 converts the received backscatter light into an electrical signal and amplifies the electrical signal for output to a signal processing block 23. The signal output by the optical detector 21 represents a moving-time-window interference pattern for light backscattered from the optical fiber 17A and the optical fiber 17B. Such interference patterns represent the interference of the backscattered light from different parts of the optical fibers 17A and 17B. If either one (or both) of the optical fibers 17A, 17B is subjected to an impinging acoustic wave (or to pressure) which can be caused, for example, by a disturbance from an unauthorized intruder or vehicle, a localized change in the effective refractive index of the respective optical fiber is induced, which causes a change in such interference patterns at a time corresponding to the location of the disturbance. During the time periods that the optical switch 15 connects to the optical fiber 17A, the signal processing block 23 converts the signal output by the optical detector 21 into digital form and processes such digital data in a time resolved manner to identify changes in the interference pattern therein and make a decision whether an intrusion has occurred based upon such interference pattern changes. Similarly, during the time periods that the optical switch 15 connects to the optical fiber 17B, the signal processing block 23 converts the signal output by the optical detector 21 into digital form and processes such digital data in a time resolved manner to identify changes in the interference pattern therein and make a decision whether an intrusion has occurred based upon such interference pattern changes. A system controller 25 receives data from the signal processing block 23 over a data path 27 therebetween. Such data provides an indication that an intrusion has occurred, a location of such intrusion, and a preferably time stamp corresponding to the time of the intrusion.

During normal operations when an intrusion occurs, the system controller 25 will receive over data path 27 data for such intrusion that results from the processing of interference pattern of optical fiber 17A as well as data for such intrusion that results from the processing of the interference pattern of optical fiber 17B. The system controller 25 can possibly verify the redundancy of such data and/or generate one or more alarm signals based on such data. Such alarm signals can be output via data path 29 to trigger an audible alarm (such as an audible alert message or tone played over a loudspeaker or bell), a visual alarm (such as an update to a display terminal that provides a visual alarm message and possibly a visual indication of the location of the intrusion), and/or any other suitable alarm event.

The signal processing block 23 (and/or the system controller 25) can perform data processing operations that analyze the backscatter signals from the two optical fibers 17A, 17B to automatically detect that a break has occurred in one or both of the optical fibers 17A, 17B and identify the location of the break. The system controller 25 can generate one or more alarm signals in the event that a break is detected. Such alarm signals can be output via data path 29 to trigger an audible alarm, a visual alarm (such as an update to a display terminal that provides a visual alarm message and possibly a visual indication of the location of the break), and/or any other suitable alarm event representing the break. Such alarm signals will be derived from the signal processing operations of the backscatter signals that return from each respective optical fiber (17A or 17B) along its length between the break point and the optical switch 13.

The system controller 25 also generates the appropriate timing signals to synchronize the time-division-multiplexed operations of the light source 11, the optical switch 15 and the signal processor block 23, which are supplied thereto over control paths 31A, 31B and 31C, respectively.

Figure 2:
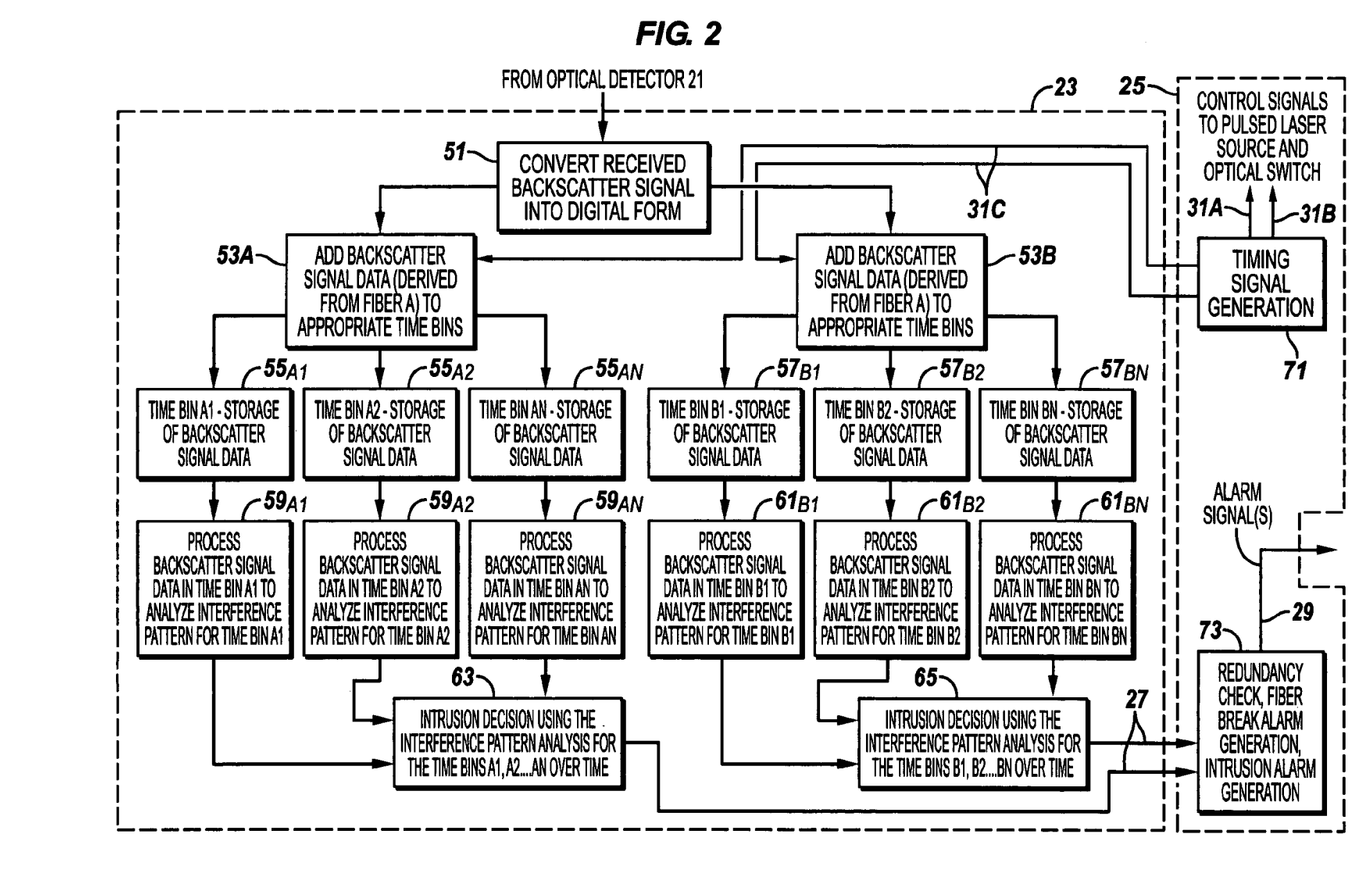
FIG. 2 is a functional block diagram of exemplary signal processing functionality and control functionality carried out by the fiber optic intrusion detection system of FIG. 1.

FIG. 2 shows an illustrative embodiment of the signal processing block 23 and system controller 25. The signal processing block 23 includes an analog-to-digital converter section 51 that interfaces to the output of the optical detector 21. The analog-to-digital converter section 51 samples the electrical signal output from the optical detector 21 at designated sampling rate and converts the samples into digital words, which represent the detected backscatter signals in digital form. Logic 53A and 53B stores the digital words generated by the converter section 51 in time bins corresponding to different sections of the two optical fibers 17A, 17B in a time-division multiplexed manner. The timing for such storage operations is derived from control signals generated by a timing signal generator block 71 of the system controller 25 and supplied thereto over control path 31C. The time bins, which are labeled $55_{A1}$, $55_{A2}$, ... $55_{AN}$ for the optical fiber 17A and $57_{B1}$, $57_{B2}$, ... $57_{BN}$ for the optical fiber 17B, correspond to different lengths of the two optical fibers 17A, 17B, respectively. Logic blocks $59_{A1}$, $59A_2$, ... $59_{AN}$ operate on the backscatter signal data stored in the corresponding time bins $55_{A1}$, $55A_2$, ... $55_{AN}$ to analyze the interference pattern in each respective time bin over time. Similarly, logic blocks $61_{B1}$, $61_{B2}$, ... $61_{BN}$ operate on the backscatter signal data stored in the corresponding time bins $57_{B1}$, $57_{B2}$, ... $57_{BN}$ to analyze the interference pattern in each respective time bin over time. A change in the interference pattern in a time bin indicates some traffic across the perimeter being monitored at the location corresponding to that time bin. In the preferred embodiment, the logic blocks $59_{A1}$, $59A_2$, ... $59_{AN}$ and the logic blocks $61_{B1}$, $61_{B2}$, ... $61_{BN}$ analyze the difference between the interference pattern in the corresponding time bin and a steady-state interference pattern for the corresponding time bin. Such differences operations can be based on convolution operations, phase difference operations, FFT operations, filtering operations and/or other operations typically used in optical time-domain reflectometry. Block 63 uses the interference pattern analysis of logic blocks $59_{A1}$, $59A_2$, ... $59_{AN}$ to make an intrusion decision, which is a decision whether or not an intrusion as occurred. Similarly, block 65 uses the interference pattern analysis of logic blocks $61_{B1}$, $61_{B2}$, ... $61_{BN}$ to make an intrusion decision. The logic of blocks 63 and 65 may utilize signature analysis to identify the type of intruder, i.e., to distinguish between humans, vehicles, and animals. When either of block 63 or block 65 determine that an intrusion has occurred, data is provided to the system controller 25 over data path 27. The data provides an indication that an intrusion has occurred, a location of such intrusion, and a preferably time stamp corresponding to the time of the intrusion.

The system controller 25 receives such data over data path 27 and includes logic block 73 that can possibly verify the redundancy of such data and/or generate one or more alarm signals based upon such data. Such alarm signals can be output via data path 29 to trigger an audible alarm (such as an audible alert message or tone played over a loudspeaker or bell), a visual alarm (such as an update to a display terminal that provides a visual alarm message and possibly a visual indication of the location of the intrusion), and/or any other suitable alarm event.

The signal processing block 23 (as part of blocks 59, 61, 63, 65) and/or system controller 25 (as part of logic block 73) can perform data processing operations that analyze the backscatter signals from the two optical fibers 17A, 17B to automatically detect that a break has occurred in one or both of the optical fibers 17A, 17B and identify the location of the break. The system controller 25 (as part of logic block 25) can generate one or more alarm signals in the event that break is detected. Such alarm signals can be output via data path 29 to trigger an audible alarm, a visual alarm (such as an update to a display terminal that provides a visual alarm message and possibly a visual indication of the location of the break), and/or any other suitable alarm event representing the break. Such alarm signals will be derived from the signal processing operations of the backscatter signals that return from each respective optical fiber (17A or 17B) along its length that extends from the break point to the optical switch 13.

The system controller 25 also includes timing signal generator block 71 that generates the appropriate timing signals to synchronize the time-division-multiplexed operations of the light source 11, the optical switch 15 and the signal processor block 23, which are supplied thereto over control paths 31A, 31B and 31C, respectively.

Figure 3:
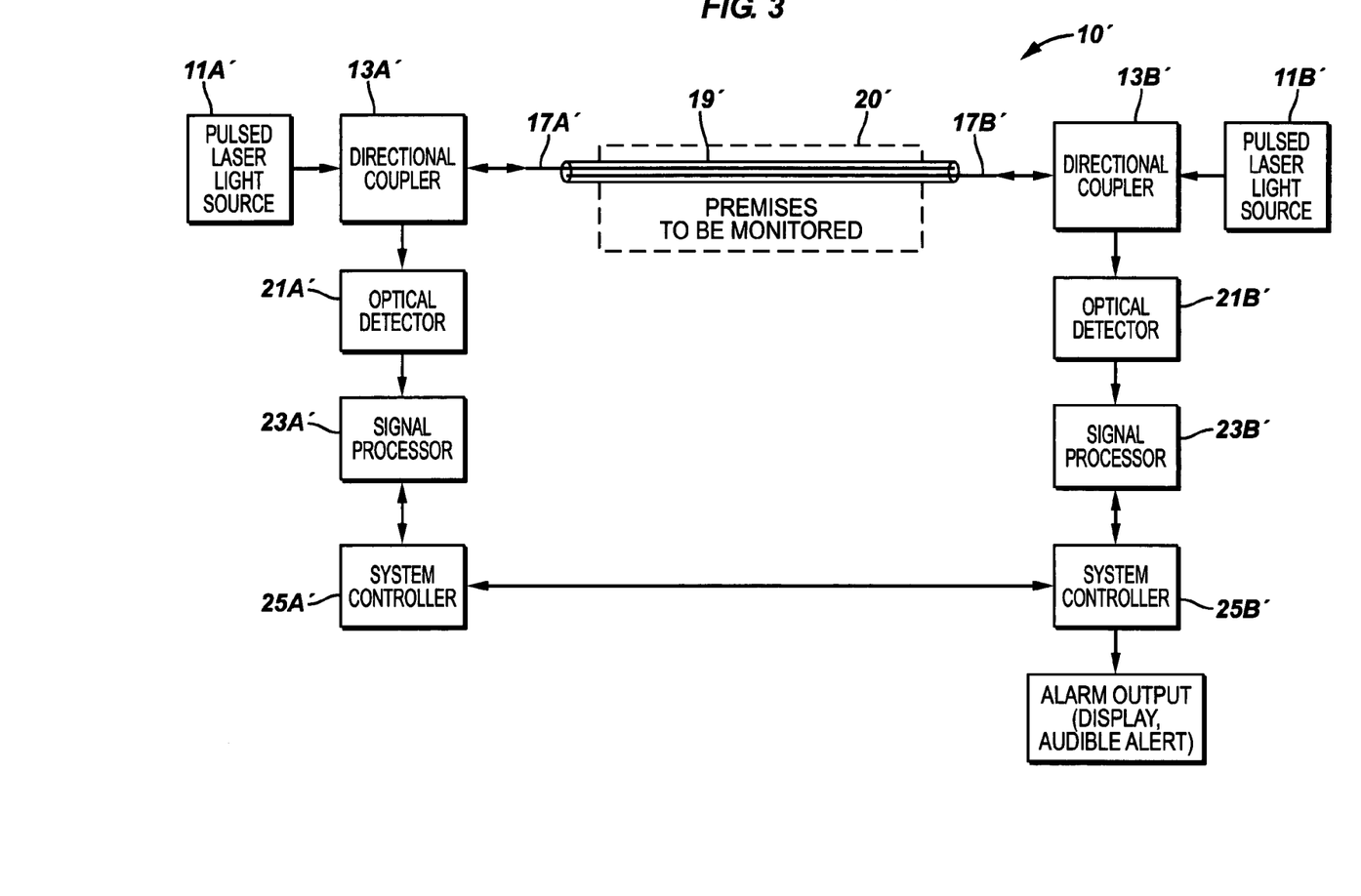
FIG. 3 is a schematic illustration of a fiber optic intrusion detection system in accordance with a second embodiment of the present invention.

Turning now to FIG. 3, an intrusion detection system 10' in accordance with a second embodiment of the present invention includes an optical time domain reflectometer (OTDR) (elements 11A', 13A', 21A', 23A', 11B', 13B', 21B', 23B') that injects a series of optical pulses into opposite ends of two optical fibers 17A', 17B', and extracts from these same opposite ends light that is scattered back and reflected back from points in the fibers where the index of refraction changes. The backscatter light is measured and stored as a function of time, and analyzed to make an intrusion decision in a fault tolerant manner.

More particularly, the optical time reflectometer is realized by a first pulsed-mode laser source 11A' that launches a sequence of highly-coherent light pulses through a first directional coupler 13A' to an optical fiber 17A'. A second pulsed-mode laser source 11B' launches a sequence of light pulses through a second directional coupler 13B' to an optical fiber 17B'. The optical fibers 17A', 17B' form the sensing element of the system, and are housed in a fiber optic cable 19', which is deployed about the periphery of the premises 20' that it to be monitored for intrusion detection. This may be along national boundaries, military facilities, chemical plants, airports, rail stations, correctional facilities, a power cable, a tunnel, a pipeline, a building, or other smart structures. For pipelines, the fiber optic cable 19' can be deployed to monitor the pipeline right of way in order to detect construction equipment entering the pipeline right-of-way before it can damage the pipeline. At one end of the fiber optic cable 19', the optical fiber 17A' is coupled to the first directional coupler 13A'. At the other end of the fiber optic cable 19', the optical fiber 17B' is coupled to the second directional coupler 13B' as shown. In this configuration, the fiber optic 17A' extends along the periphery of the premises 20' to be monitored in one direction (from left to right), and the fiber optic 17B extends along the periphery of the premises 20 to be monitored in an opposite direction (from right to left). As a pulse propagates along either one of the optical fiber 17A' or the optical fiber 17B', its light is scattered through several mechanisms, including density and composition fluctuations (Rayleigh scattering) as well as molecular and bulk vibrations (Raman and Brillouin scattering, respectively). Some of this scattered light is retained within the respective fiber core and is guided back towards the respective laser sources 11A', 11B'. This returning light passes through the respective directional couplers 13A', 13B', where it is directed to corresponding optical detectors 21A', 21B'.

The optical detectors 21A', 21B' each convert the received backscatter light into an electrical signal and amplifies the electrical signal for output to corresponding signal processing blocks 23A', 23B'. The signal output by the optical detectors 21A', 21B' represents a moving-time-window interference pattern for light backscattered from the optical fiber 17A' and the optical fiber 17B', respectively. Such interference patterns represent the interference of the backscattered light from different parts of the optical fibers 17A' and 17B'. If either one (or both) of the optical fibers 17A', 17B' is subjected to an impinging acoustic wave (or pressure) which can be caused, for example, by a disturbance from an unauthorized intruder or vehicle, a localized change in the effective refractive index of the respective optical fiber is induced, which causes a change in such interference patterns at a time corresponding to the location of the disturbance. The signal processing block 23A' converts the signal output by the optical detector 21A' into digital form and processes such digital data in a time resolved manner to identify changes in the interference pattern therein and make a decision whether an intrusion has occurred based upon such interference pattern changes. Similarly, the signal processing block 23B' converts the signal output by the optical detector 21B' into digital form and processes such digital data in a time resolved manner to identify changes in the interference pattern therein and make a decision whether an intrusion has occurred based upon such interference pattern changes.

System controller 25B' receives data from the signal processing block 23B' which provides an indication that an intrusion has occurred, a location of such intrusion, and a preferably time stamp corresponding to the time of the intrusion. System controller 25A' receives data from the signal processing block 23A' which provides an indication that an intrusion has occurred, a location of such intrusion, and a preferably time stamp corresponding to the time of the intrusion. System controller 25A' communicates such data to the system controller 25B' over a communication link therebetween, which can be a wired or wireless communication link.

During normal operations when an intrusion occurs, the system controller 25B' will receive data from signal processing block 23A' that results from the processing of interference pattern of optical fiber 17A' as well as data from the signal processing block 23B' that results from the processing of the interference pattern of optical fiber 17B'. The system controller 25B' can possibly verify the redundancy of such data and/or generate one or more alarm signals based on such data. Such alarm signals can be output to trigger an audible alarm (such as an audible alert message or tone played over a loudspeaker or bell), a visual alarm (such as an update to a display terminal that provides a visual alarm message and possibly a visual indication of the location of the intrusion), and/or any other suitable alarm event.

The signal processing blocks 23A', 23B' (and/or the system controller 25B') can perform data processing operations that analyze the backscatter signals from the two optical fibers 17A', 17B' to automatically detect that a break has occurred in one or both of the optical fibers 17A', 17B' and identify the location of the break. The system controller 25B' can generate one or more alarm signals in the event that a break is detected. Such alarm signals can be output to trigger an audible alarm, a visual alarm (such as an update to a display terminal that provides a visual alarm message and possibly a visual indication of the location of the break), and/or any other suitable alarm event representing the break. Such alarm signals will be derived from the signal processing operations of the backscatter signals that return from each respective optical fiber (17A' or 17B') along its length between the break point and the respective directional coupler (13A' or 13B').

Figure 4:
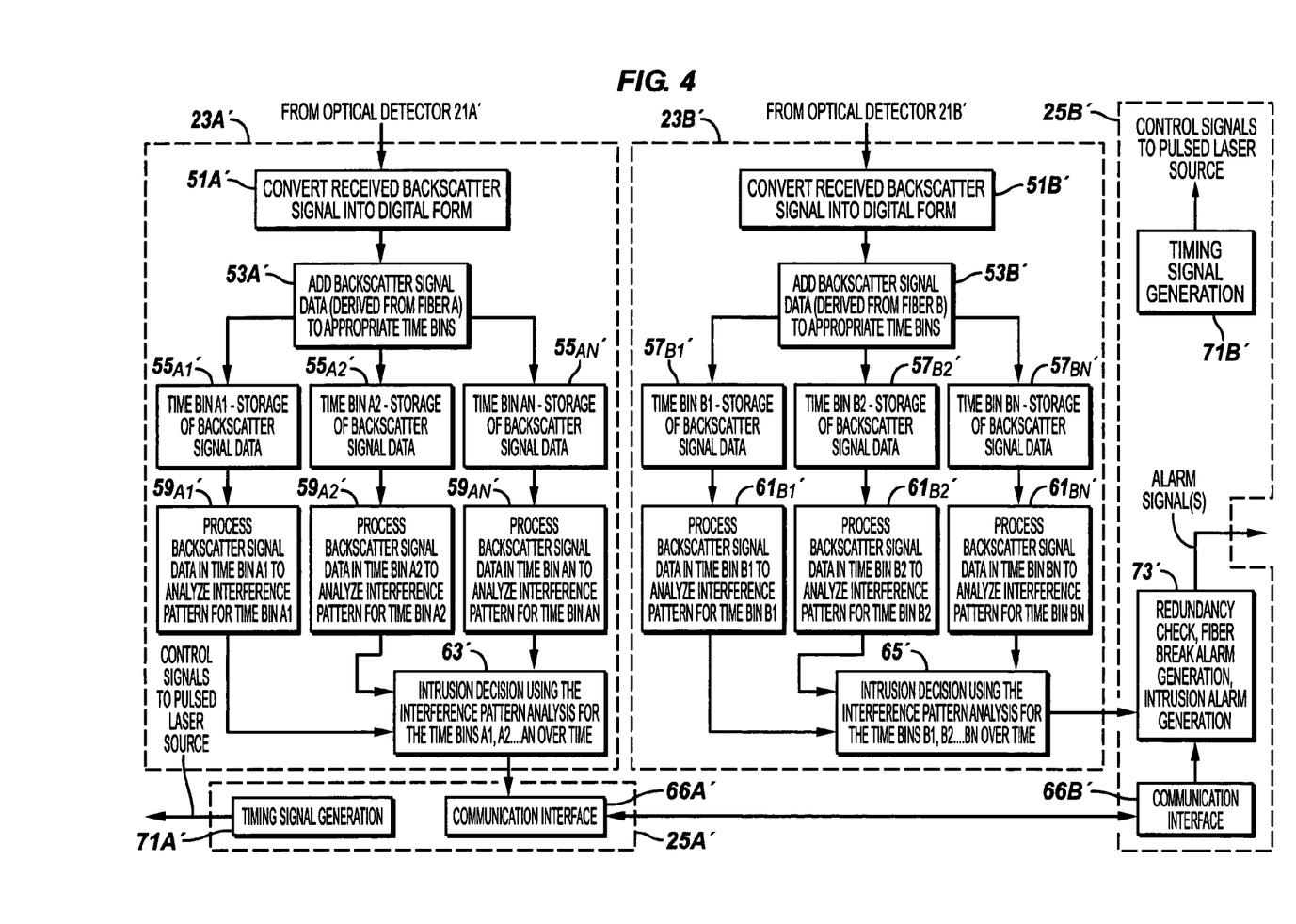
FIG. 4 is a functional block diagram of exemplary signal processing functionality and control functionality carried out by the fiber optic intrusion detection system of FIG. 3.

FIG. 4 shows an illustrative embodiment of the signal processing block 23A' and system controller 25A' as well as the signal processing block 23B' and system controller 25B'. The signal processing block 23A' includes an analog-to-digital converter section 51A' that interfaces to the output of the optical detector 21A'. The analog-to-digital converter section 51A' samples the electrical signal output from the optical detector 21A' at a predetermined sample rate and converts the samples into digital words, which represent the detected backscatter signals in digital form. Logic 53A' stores the digital words generated by the converter section 51A' in time bins corresponding to different sections of the first optical fiber 17A'. The time bins, which are labeled $55_{A1}'$, $55_{A2}'$, ... $55_{AN}'$ for the optical fiber 17A', correspond to different lengths of the first optical fiber 17A'. Logic blocks $59_{A1}'$, $59_{A2}'$, ... $59_{AN}'$ operate on the backscatter signal data stored in the corresponding time bins $55_{A1}'$, $55_{A2}'$, ... $55_{AN}'$ to analyze the interference pattern in each respective time bin over time. A change in the interference pattern in a time bin indicate some traffic across the perimeter being monitored at the location corresponding to that time bin. In the preferred embodiment, the logic blocks $59_{A1}'$, $59_{A2}'$, ... $59_{AN}'$ analyze the difference between the interference pattern in the corresponding time bin and a steady-state interference pattern for the corresponding time bin. Such differences operations can be based on convolution operations, phase difference operations, FFT operations, filtering operations and/or other operations typically used in optical time-domain reflectometry. Block 63' uses the interference pattern analysis of logic blocks $59_{A1}'$, $59_{A2}'$, ... $59_{AN}'$ to make an intrusion decision, which is a decision whether or not an intrusion as occurred.

Similarly, the signal processing block 23B' includes an analog-to-digital converter section 51B' that interfaces to the output of the optical detector 21B'. The analog-to-digital converter section 51B' samples the electrical signal output from the optical detector 21B' at a predetermined sample rate and converts the samples into digital words, which represent the detected backscatter signals in digital form. Logic 53B' stores the digital words generated by the converter section 51B' in time bins corresponding to different sections of the first optical fiber 17B'. The time bins, which are labeled $57_{B1}'$, $57_{B2}'$, ... $57_{BN}'$ for the optical fiber 17B', correspond to different lengths of the second optical fiber 17B'. Logic blocks $61_{B1}'$, $61_{B2}'$, ... $61_{BN}'$ operate on the backscatter signal data stored in the corresponding time bins $57_{B1}'$, $57_{B2}'$, ... $57_{BN}'$ to analyze the interference pattern in each respective time bin over time. In the preferred embodiment, the logic blocks $61_{B1}'$, $61_{B2}'$, ... $61_{BN}'$ analyze the difference between the interference pattern in the corresponding time bin and a steady-state interference pattern for the corresponding time bin. Such differences operations can be based on convolution operations, phase difference operations, FFT operations, filtering operations and/or other operations typically used in optical time-domain reflectometry. Block 65' uses the interference pattern analysis of logic blocks $61_{B1}'$, $61_{B2}'$, ... $61_{BN}'$ to make an intrusion decision. The logic of blocks 63' and 65' may utilize signature analysis to identify the type of intruder, i.e., to distinguish between humans, vehicles, and animals.

When block 63' detects an intrusion, data is provided to the system controller 25A' which provides an indication that an intrusion has occurred, a location of such intrusion, and a preferably time stamp corresponding to the time of the intrusion. System controller 25A' communicates such data to the system controller 25B' over a communication link therebetween supported by communication interfaces 66A' and 66B'. Similarly, when block 65' detects an intrusion, data is provided to the system controller 25B' which provides an indication that an intrusion has occurred, a location of such intrusion, and a preferably time stamp corresponding to the time of the intrusion.

The system controller 25B' receives such data and includes logic block 73' that can possibly verify the redundancy of such data and/or generate one or more alarm signals based upon such data. Such alarm signals can be output to trigger an audible alarm (such as an audible alert message or tone played over a loudspeaker or bell), a visual alarm (such as an update to a display terminal that provides a visual alarm message and possibly a visual indication of the location of the intrusion), and/or any other suitable alarm event.

The signal processing blocks 23A', 23B' (as part of blocks 59', 61', 63', 65') and/or the system controller 25B' (as part of logic block 73') can perform data processing operations that analyze the backscatter signals from the two optical fibers 17A', 17B' to automatically detect that a break has occurred in one or both of the optical fibers 17A', 17B' and identify the location of the break. The system controller 25B' (as part of block 73') can generate one or more alarm signals in the event that a break is detected. Such alarm signals can be output to trigger an audible alarm, a visual alarm (such as an update to a display terminal that provides a visual alarm message and possibly a visual indication of the location of the break), and/or any other suitable alarm event representing the break. Such alarm signals will be derived from the signal processing operations of the backscatter signals returned from each respective optical fiber (17A' or 17B') along its length between the break point and the respective directional coupler (17A' or 17B').

The system controllers 25A' and 25B' also include respective timing signal generator blocks 71A' and 71B' that generate the appropriate timing signals to drive the pulsed-mode light sources 11A', 11B', respectively.

Figure 5:
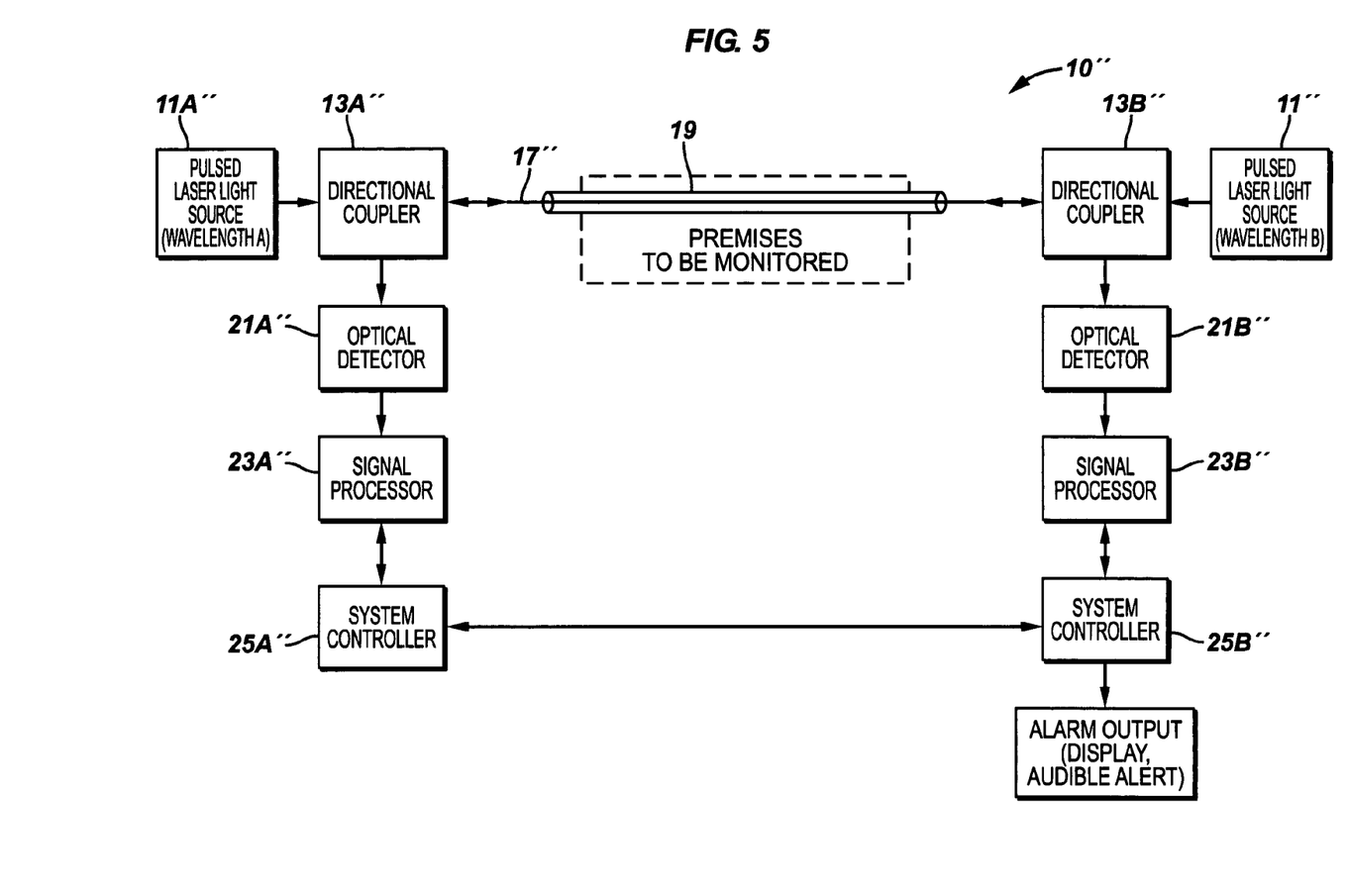
FIG. 5 is a schematic illustration of a fiber optic intrusion detection system in accordance with a third embodiment of the present invention.

Turning now to FIG. 5, an intrusion detection system 10" in accordance with a third embodiment of the present invention includes an optical time domain reflectometer (OTDR) (elements 11A", 13A", 21A", 23A", 11B", 13B", 21B", 23B") that injects a series of optical pulses at different wavelengths into opposite ends of an optical fiber 17", and extracts from these same opposite ends light that is scattered back and reflected back from points in the fibers where the index of refraction changes. The backscatter light for the two wavelengths is measured and stored as a function of time, and analyzed to make an intrusion decision in a fault tolerant manner.

More particularly, the optical time reflectometer is realized by a first pulsed-mode laser source 11A" that launches a sequence of highly-coherent light pulses through a first directional coupler 13A" to the optical fiber 17". A second pulsed-mode laser source 11B" launches a sequence of light pulses through a second directional coupler 13B" to the same optical fiber 17". The laser source 11A" operates at a first wavelength ($\lambda_A$), while the laser source 11B" operates at a second wavelength ($\lambda_B$) different than the first wavelength ($\lambda_A$). The optical fiber 17" forms the sensing element of the system, and is housed in a fiber optic cable 19", which is deployed about the periphery of the premises 20" that it to be monitored for intrusion detection. This may be along national boundaries, military facilities, chemical plants, airports, rail stations, correctional facilities, a power cable, a tunnel, a pipeline, a building, or other smart structures. For pipelines, the fiber optic cable 19" can be deployed to monitor the pipeline right of way in order to detect construction equipment entering the pipeline right-of-way before it can damage the pipeline. At one end of the fiber optic cable 19", the optical fiber 17" is coupled to the first directional coupler 13A". At the other end of the fiber optic cable 19", the optical fiber 17" is coupled to the second directional coupler 13B" as shown. As a pulse propagates along the optical fiber 17", its light is scattered through several mechanisms, including density and composition fluctuations (Rayleigh scattering) as well as molecular and bulk vibrations (Raman and Brillouin scattering, respectively). Some of this scattered light is retained within the respective fiber core and is guided back towards the respective laser sources 11A", 11B". This returning light passes through the respective directional couplers 13A", 13B", where it is directed to corresponding optical detectors 21A", 21B".

The optical detectors 21A", 21B" each convert the received backscatter light into an electrical signal and amplifies the electrical signal for output to corresponding signal processing blocks 23A", 23B". The signal output by the optical detectors 21A" represents a moving-time-window interference pattern for light backscattered from the optical fiber 17" for the first wavelength ($\lambda_A$). The signal output by the optical detectors 21B" represents a moving-time-window interference pattern for light backscattered from the optical fiber 17" for the second wavelength ($\lambda_B$). Such interference patterns represent the interference of the backscattered light from different parts of the optical fiber 17A". If the optical fiber 17" is subjected to an impinging acoustic wave (or to pressure) which can be caused, for example, by a disturbance from an unauthorized intruder or vehicle, a localized change in the effective refractive index of the respective optical fiber is induced, which causes a change in such interference patterns at a time corresponding to the location of the disturbance. The signal processing block 23A" converts the signal output by the optical detector 21A" into digital form and processes such digital data in a time resolved manner to identify changes in the interference pattern for the first wavelength ($\lambda_A$) and make a decision whether an intrusion has occurred based upon such interference pattern changes. Similarly, the signal processing block 23B" converts the signal output by the optical detector 21B" into digital form and processes such digital data in a time resolved manner to identify changes in the interference pattern for the second wavelength ($\lambda_B$) and make a decision whether an intrusion has occurred based upon such interference pattern changes.

System controller 25B" receives data from the signal processing block 23B" which provides an indication that an intrusion has occurred, a location of such intrusion, and a preferably time stamp corresponding to the time of the intrusion. System controller 25A" receives data from the signal processing block 23A" which provides an indication that an intrusion has occurred, a location of such intrusion, and a preferably time stamp corresponding to the time of the intrusion. System controller 25A" communicates such data to the system controller 25B" over a communication link therebetween, which can be a wired or wireless communication link.

During normal operations when an intrusion occurs, the system controller 25B" will receive data from signal processing block 23A" that results from the processing of the interference pattern for the wavelength $\lambda_A$ as well as data from the signal processing block 23B" that results from the processing of the interference pattern for the wavelength $\lambda_B$. The system controller 25B" can possibly verify the redundancy of such data and/or generate one or more alarm signals based on such data. Such alarm signals can be output to trigger an audible alarm (such as an audible alert message or tone played over a loudspeaker or bell), a visual alarm (such as an update to a display terminal that provides a visual alarm message and possibly a visual indication of the location of the intrusion), and/or any other suitable alarm event.

The signal processing blocks 23A", 23B" (and/or the system controller 25B") can perform data processing operations that analyze the backscatter signals for the two wavelengths to automatically detect that a break has occurred in the optical fiber 17" and identify the location of the break. The system controller 25B" can generate one or more alarm signals in the event that a break is detected. Such alarm signals can be output to trigger an audible alarm, a visual alarm (such as an update to a display terminal that provides a visual alarm message and possibly a visual indication of the location of the break), and/or any other suitable alarm event representing the break. Such alarm signals will be derived from the signal processing operations of the backscatter signals returned from the optical fiber 17" along its length between the break point and the respective directional coupler (13A" or 13B").

Figure 6:
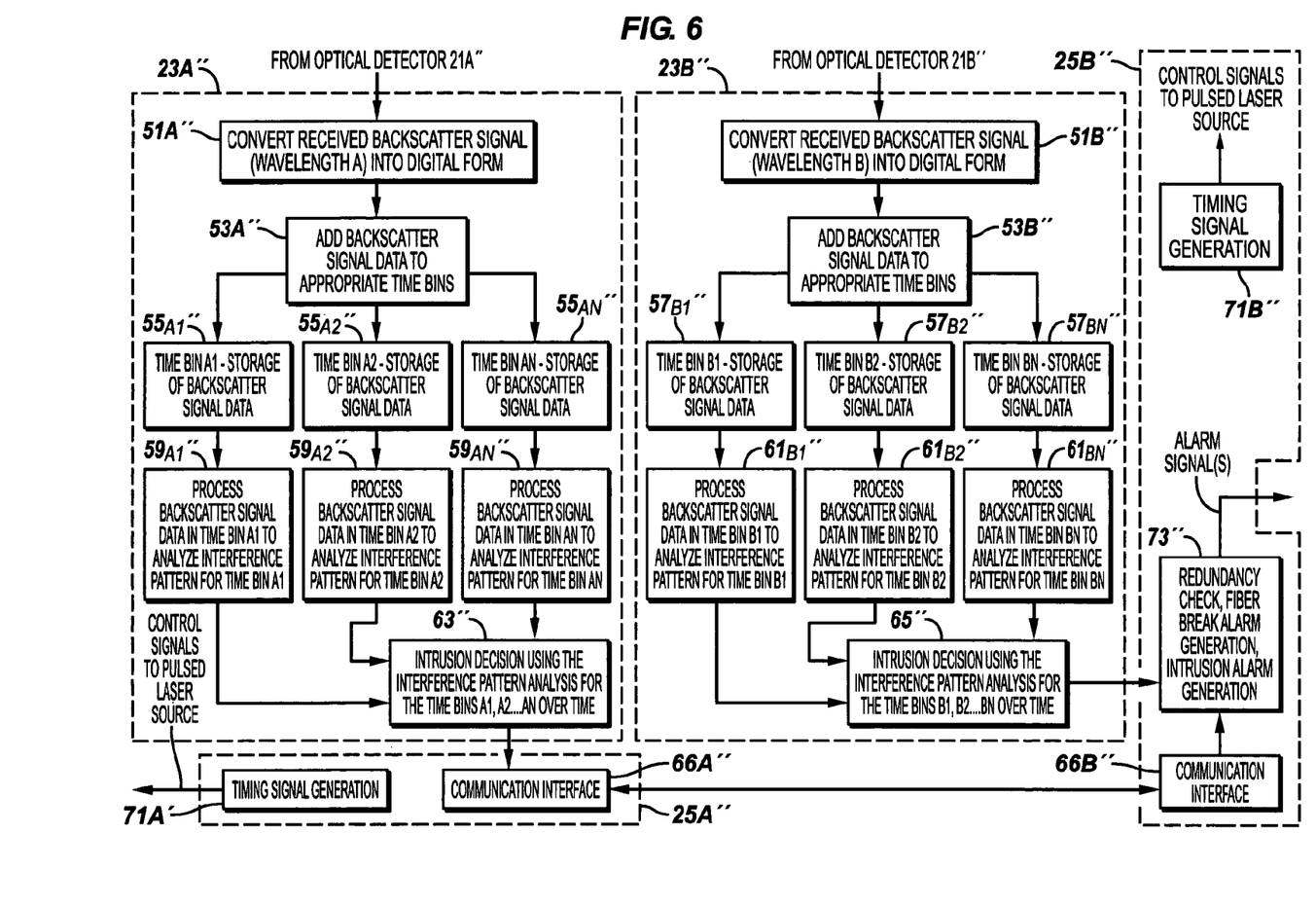
FIG. 6 is a functional block diagram of exemplary signal processing functionality and control functionality carried out by the fiber optic intrusion detection system of FIG. 5.

FIG. 6 shows an illustrative embodiment of the signal processing block 23A" and system controller 25A" as well as the signal processing block 23B" and system controller 25B". The signal processing block 23A" includes an analog-to-digital converter section 51A" that interfaces to the output of the optical detector 21A". The analog-to-digital converter section 51A" samples the electrical signal output from the optical detector 21A" at a predetermined sample rate and converts the samples into digital words, which represent the detected backscatter signals for the first wavelength $\lambda_A$ in digital form. Logic 53A" stores the digital words generated by the converter section 51A" in time bins corresponding to different sections of the optical fiber 17". The time bins, which are labeled $55_{A1}$", $55_{A2}$", ... $55_{AN}$" correspond to different lengths of the optical fiber 17" for the first wavelength $\lambda_A$. Logic blocks $59_{A1}$", $59_{A2}$", ... $59_{AN}$" operate on the backscatter signal data stored in the corresponding time bins $55_{A1}$", $55_{A2}$", ... $55_{AN}$" to analyze the interference pattern in each respective time bin over time. A change in the interference pattern in a time bin indicate some traffic across the perimeter being monitored at the location corresponding to that time bin. In the preferred embodiment, the logic blocks $55_{A1}$", $55_{A2}$", ... $55_{AN}$" analyze the difference between the interference pattern in the corresponding time bin and a steady-state interference pattern for the corresponding time bin. Such differences operations can be based on convolution operations, phase difference operations, FFT operations, filtering operations and/or other operations typically used in optical time-domain reflectometry. Block 63" uses the interference pattern analysis of logic blocks $59_{A1}$", $59_{A2}$", ... $59_{AN}$" to make an intrusion decision, which is a decision whether or not an intrusion as occurred.

Similarly, the signal processing block 23B" includes an analog-to-digital converter section 51B" that interfaces to the output of the optical detector 21B". The analog-to-digital converter section 51B" samples the electrical signal output from the optical detector 21B' at a predetermined sample rate and converts the samples into digital words, which represent the detected backscatter signals for the second wavelength $\lambda_B$ in digital form. Logic 53B" stores the digital words generated by the converter section 51B" in time bins corresponding to different sections of the optical fiber 17". The time bins, which are labeled $57_{B1}$', $57_{B2}$', ... $57_{BN}$' correspond to different lengths of the optical fiber 17" for the second wavelength $\lambda_B$. Logic blocks $61_{B1}$", $61_{B2}$", ... $61_{BN}$" operate on the backscatter signal data stored in the corresponding time bins $57_{B1}$", $57_{B2}$", ... $57_{BN}$" to analyze the interference pattern in each respective time bin over time. In the preferred embodiment, the logic blocks $61_{B1}$", $61_{B2}$", ... $61_{BN}$" analyze the difference between the interference pattern in the corresponding time bin and a steady-state interference pattern for the corresponding time bin. Such differences operations can be based on convolution operations, phase difference operations, FFT operations, filtering operation and/or other operations typically used in optical time-domain reflectometry. Block 65" uses the interference pattern analysis of logic blocks $61_{B1}$", $61_{B2}$", ... $61_{BN}$" to make an intrusion decision. The logic of blocks 63" and 65" may utilize signature analysis to identify the type of intruder, i.e., to distinguish between humans, vehicles, and animals.

When block 63" detects an intrusion, data is provided to the system controller 25A" which provides an indication that an intrusion has occurred, a location of such intrusion, and a preferably time stamp corresponding to the time of the intrusion. System controller 25A" communicates such data to the system controller 25B" over a communication link therebetween supported by communication interfaces 66A" and 66B". Similarly, when block 65" detects an intrusion, data is provided to the system controller 25B" which provides an indication that an intrusion has occurred, a location of such intrusion, and a preferably time stamp corresponding to the time of the intrusion. The system controller 25B" receives such data and includes logic block 73" that can possibly verify the redundancy of such data and/or generate one or more alarm signals based on such data. Such alarm signals can be output to trigger an audible alarm (such as an audible alert message or tone played over a loudspeaker or bell), a visual alarm (such as an update to a display terminal that provides a visual alarm message and possibly a visual indication of the location of the intrusion), and/or any other suitable alarm event.

The signal processing block 23A", 23B" (as part of blocks 59", 61", 63", 65") and/or the system controller 25B" (as part of logic block 73") can perform data processing operations that analyze the backscatter signals for the two wavelengths to automatically detect that a break has occurred in the optical fiber 17" and identify the location of the break. The system controller 25B" can generate one or more alarm signals in the event that a break is detected. Such alarm signals can be output to trigger an audible alarm, a visual alarm (such as an update to a display terminal that provides a visual alarm message and possibly a visual indication of the location of the break), and/or any other suitable alarm event representing the break. Such alarm signals will be derived from the signal processing operations of the backscatter signals returned from the optical fiber 17" along its length between the break point and the respective directional coupler (13A" or 13B").

The system controllers 25A" and 25B" also include respective timing signal generator blocks 71A" and 71B" that generate the appropriate timing signals to drive the pulsed-mode light sources 11A", 11B", respectively.

Advantageously, the fiber-optic based intrusion detection systems described herein provide continued operation in the event that a break occurs in the sensing optical fiber of the system. Such systems also report the position of such a break. Moreover, the fiber-optic based intrusion detection systems described herein can be used for a wide variety of applications, such as monitoring national boundaries, military facilities, chemical plants, airports, rail stations, correctional facilities, a power cable, a tunnel, a pipeline, a building, or other smart structures.

There have been described and illustrated herein several embodiments of a fault tolerant intrusion detection system employing an OTDR subsystem and methods of operating same. While particular embodiments of the invention have been described, it is not intended that the invention be limited thereto, as it is intended that the invention be as broad in scope as the art will allow and that the specification be read likewise. Thus, while particular signal processing functions and methodologies for intrusion detection have been disclosed, it will be appreciated that other signal processing functions and methodologies for intrusion detection as well. In addition, while particular system architectures have been disclosed, it will be understood that other system architectures can be used. For example, the signal processing steps and/or control and alarm notification steps as described herein can be carried out by on a single computer processing platform, or on a distributed computer processing platform as is well known. It will therefore be appreciated by those skilled in the art that yet other modifications could be made to the provided invention without deviating from its spirit and scope as claimed.

What is claimed is:

1. An intrusion detection system for monitoring a premises comprising:
    an optical cable that extends about the premises and has a first end opposite a second end, the optical cable comprising an optical fiber having a first end opposite a second end; and
    a highly coherent optical time domain reflectometry means, operably coupled to the first end and the second end of the optical cable, comprising:
    a highly coherent optical source to generate a first optical signal to launch into the first end of the optical fiber at a first wavelength and a second optical signal to launch into the second end of the optical fiber at a second wavelength different than the first wavelength; and
    signal processing circuitry that analyzes a first backscatter signal and a second backscatter signal received via the first end and the second end, respectively, of the optical fiber in response to the first launched optical signal and the second launched optical signal, respectively, in order to detect an intrusion of the premises, wherein the first and second backscatter signals in the optical fiber are affected by an acoustic wave or pressure incident on the optical cable caused by the intrusion of the premises.

2. An intrusion detection system according to claim 1, wherein the signal processing circuitry comprises first signal processing circuitry to analyze the first backscatter signals and second signal processing circuitry to analyze the second backscatter signals, and the system further comprising:
    control means, operably coupled to the first signal processing circuitry and the second signal processing circuitry, for verifying redundancy of intrusions decisions made by the first and second signal processing circuitry.

3. An intrusion detection system according to claim 2, wherein:
    said control means comprises a first part operably coupled to said first signal processing means, a second part operably coupled to said second signal processing means and remotely located therefrom, and communication means for communicating data between the first and second parts.

4. An intrusion detection system according to claim 1, further comprising:
    means for analyzing the first backscatter signal and the second backscatter signal to detect a break in the optical fiber.

5. An intrusion detection system according to claim 4, further comprising:
    means for identifying location of the break in the optical fiber.

6. An intrusion detection system according to claim 5, further comprising:
    means for outputting the location of the break in the optical fiber to a user.

7. An intrusion detection system according to claim 4, further comprising:
    means, operating in response to detection of the break, for raising an alarm indicating the break in the optical fiber.

8. An intrusion detection system according to claim 1, wherein:
    said signal processing circuitry stores backscatter signal data corresponding to the first backscatter signal in a first set of time bins corresponding to different lengths of the optical fiber and analyzes interference patterns represented by the backscatter signal data stored in the respective time bins of the first set over time in order to make a first intrusion decision; and said signal processing circuitry stores backscatter signal data corresponding to the second backscatter signal in a second set of time bins corresponding to different lengths of the optical fiber and analyses interference patterns represented by the backscatter signal data stored in the respective time bins of the second set over time in order to make a second intrusion decision.

9. An intrusion detection system according to claim 1, comprising:
an optical cable housing a pair of optical fibers each having a first end opposite a second end, wherein the first end of one optical fiber of the optical fiber pair is operably coupled to the optical time domain reflectometry means, and the second end of the other optical fiber of the optical fiber pair is operably coupled to the optical time domain reflectometry means.

10. An intrusion detection system according to claim 9, wherein:
The highly coherent optical source includes
a laser source for generating highly coherent optical pulses,
an optical detector,
a directional coupler and an optical switch, operably coupled between said highly coherent optical source and said optical fiber pair, that directs said highly coherent optical pulses over said optical fiber pair in a time-division-multiplexed manner and that directs scatter that propagates back along said optical fiber pair to said optical detector in a time-division-multiplexed manner,
wherein the signal processing circuitry analyzes the backscatter signal received via the first end of the one optical fiber in order to detect an intrusion of the premises, and
wherein the signal processing circuitry analyzes the backscatter signal received via the second end of the other optical fiber in order to detect an intrusion of the premises.

11. An intrusion detection system according to claim 1, wherein:
the highly coherent optical source includes
a first laser source for generating the first optical signal comprising first highly coherent optical pulses, and
a second laser source for generating the second optical signal comprising second highly coherent optical pulses, and
the optical time domain reflectometry means includes
a first optical detector,
a first directional coupler operably coupled between said first laser source and the first end of the optical fiber, that directs said first optical pulses generated by the first laser source to the first end of the optical fiber and that directs the first backscatter signal that propagates back along the optical fiber to said first optical detector, wherein the signal processing circuitry analyzes the first backscatter signal received via the first end of the optical fiber in order to detect an intrusion of the premises,
a second optical detector, and
a second directional coupler operably coupled between said second laser source and the second end of the optical fiber, that directs said second optical pulses generated by the second laser source to the second end of the optical fiber and that directs the second backscatter signal that propagates back along the optical fiber to said second optical detector, wherein the signal processing circuitry analyzes the second backscatter signal received via the second end of the optical fiber in order to detect an intrusion of the premises.

12. An intrusion detection system according to claim 11, further comprising:
means for analyzing the first backscatter signal and the second backscatter signal to detect a break in the optical fiber.

13. A method of detecting intrusion of a premises comprising:
providing at least one optical cable that extends about the premises, the at least one optical cable having a first end opposite a second end that are coupled to a highly coherent optical time domain reflectometry means, the at least one optical cable comprising an optical fiber having a first end opposite a second end, wherein the highly coherent optical time domain reflectometry means includes a highly coherent optical source to generate first optical signals to launch into the first end of the optical fiber at a first wavelength and second optical signals to launch into the second end of the optical fiber at a second wavelength different than the first wavelength; and
using the optical time domain reflectometry means to analyze a first backscatter signal received via the first end of the optical fiber in response to the first optical signals and to analyze a second backscatter signal received via the second end of the optical fiber in response to the second optical signals in order to detect an intrusion of the premises, wherein the first backscatter signal and the second backscatter signal in the optical fiber are affected by an acoustic wave or pressure incident on the optical cable caused by the intrusion of the premises.

14. A method according to claim 13, further comprising:
verifying redundancy of intrusions decisions based upon the analysis of the first and second backscatter signals received via the first and second ends, respectively, of the optical fiber.

15. A method according to claim 13, further comprising:
detecting a break in the optical fiber based upon the analysis of the first and the second backscatter signals received via the first and second ends, respectively, of the optical fiber.

16. A method according to claim 15, further comprising:
identifying location of the break in the optical fiber.

17. A method according to claim 16, further comprising:
outputting to a user the location of the break in the optical fiber.

18. A method according to claim 13, further comprising:
in response to detection of the break, raising an alarm indicating the break in the optical fiber.

19. A method according to claim 13, wherein:
the optical time domain reflectometry means stores backscatter signal data in a set of time bins corresponding to different lengths of the optical fiber and analyzes interference patterns represented by the backscatter signal data stored in the respective time bins of the set over time in order to make intrusion decisions.

20. A method according to claim 13, wherein:
the at least one optical cable comprises an optical cable housing a pair of optical fibers each having a first end opposite a second end, wherein the first end of one of the optical fiber pair is operably coupled to the optical time domain reflectometry means, and the second end of the other one of the optical fiber pair is operably coupled to the optical time domain reflectometry means.

21. A method according to claim 20, wherein:
the optical time domain reflectometry means includes
- a laser source for generating highly coherent optical pulses,
- an optical detector, and
- a directional coupler and an optical switch, operably coupled between said laser source and said optical fiber pair, that directs said first and second optical pulses over said optical fiber pair in a time-division-multiplexed manner and that directs scatter that propagates back along said optical fiber pair to said optical detector in a time- division-multiplexed manner, and the method further comprises
- analyzing the backscatter signal received via the first end of the one optical fiber in order to detect an intrusion of the premises, and
- analyzing the backscatter signal received via the second end of the other optical fiber in order to detect an intrusion of the premises.

22. A method according to claim 13, wherein:
the highly coherent optical source includes
- a first laser source for generating the first optical signals comprising first highly coherent optical pulses,
- a first optical detector,
- a first directional coupler operably coupled between said first laser source and the first end of the optical fiber, that directs said first optical pulses generated by the first laser source to the one optical fiber and that directs the first backscatter signal that propagates back along the optical fiber to said first optical detector, wherein first signal processing circuitry analyzes the first backscatter signal received via the first end of the optical fiber in order to detect an intrusion of the premises,
- a second laser source for generating the second optical signals comprising second highly coherent optical pulses,
- a second optical detector, and
- a second directional coupler operably coupled between said second laser source and the second end of the optical fiber, that directs said second optical pulses generated by the second laser source to the second end of the optical fiber and that directs the second backscatter signal that propagates back along the optical fiber to said second optical detector, wherein second signal processing circuitry analyzes the second backscatter signal received via the second end of the optical fiber in order to detect an intrusion of the premises.

23. method according to claim 13,
further comprising
analyzing the first backscatter signal and the second backscatter signal to detect a break in the optical fiber.

* * * * *